(12) United States Patent
Terai et al.

(10) Patent No.: US 9,893,530 B2
(45) Date of Patent: Feb. 13, 2018

(54) POWER CONTROL DEVICE, POWER CONTROL METHOD, AND POWER CONTROL SYSTEM

(71) Applicant: KYOCERA Corporation, Kyoto (JP)

(72) Inventors: Ryota Terai, Yokohama (JP); Kenta Okino, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 252 days.

(21) Appl. No.: 14/894,294

(22) PCT Filed: May 26, 2014

(86) PCT No.: PCT/JP2014/002764
§ 371 (c)(1),
(2) Date: Nov. 25, 2015

(87) PCT Pub. No.: WO2014/192281
PCT Pub. Date: Dec. 4, 2014

(65) Prior Publication Data
US 2016/0118798 A1 Apr. 28, 2016

(30) Foreign Application Priority Data
May 27, 2013 (JP) .................. 2013-111249

(51) Int. Cl.
*H02J 3/38* (2006.01)
*H02J 3/14* (2006.01)
(Continued)

(52) U.S. Cl.
CPC ............... *H02J 3/383* (2013.01); *H02J 3/14* (2013.01); *H02J 3/381* (2013.01); *H02J 3/387* (2013.01);
(Continued)

(58) Field of Classification Search
CPC .... H02J 3/387; H02J 3/14; H02J 3/381; H02J 9/062; Y04S 20/222; Y04S 20/248; Y02B 7/3291; Y02B 70/3225
See application file for complete search history.

(56) References Cited

U.S. PATENT DOCUMENTS

2011/0018342 A1 1/2011 Park et al.
2011/0140667 A1 6/2011 Moon
(Continued)

FOREIGN PATENT DOCUMENTS

JP 2001-008380 A 1/2001
JP 2007-043802 A 2/2007
(Continued)

OTHER PUBLICATIONS

Office Action dated Jan. 31, 2017 issued by the Japan Patent Office in Counterpart Japanese Application No. 2015-519642, 5 pgs.
(Continued)

*Primary Examiner* — Robert Deberadinis
(74) *Attorney, Agent, or Firm* — Procopio Cory Hargreaves and Savitch LLP

(57) ABSTRACT

A power control device, power control method, and power control system capable of appropriate power control so that power consumption does not exceed contract power with an electric power company even in the event of a power failure are provided. A power control device installed in a consumer's facility to manage a power state of a load apparatus or a dispersed power source in the consumer's facility, includes: a communicator configured to acquire sensor data relating to the load apparatus or the dispersed power source; a backup power source that is charged with a commercial power source, and supplies power during a power failure; and a controller configured to issue a control instruction to the dispersed power source, when the backup power source supplies power.

14 Claims, 5 Drawing Sheets

(51) Int. Cl.
    *H02J 9/06*     (2006.01)
    *H02J 7/00*     (2006.01)

(52) U.S. Cl.
    CPC ............ *H02J 7/0068* (2013.01); *H02J 9/061* (2013.01); *H02J 9/062* (2013.01); *Y02B 70/3225* (2013.01); *Y02B 70/3291* (2013.01); *Y04S 20/222* (2013.01); *Y04S 20/248* (2013.01)

(56) References Cited

U.S. PATENT DOCUMENTS

| | | |
|---|---|---|
| 2013/0024041 A1 | 1/2013 | Golden et al. |
| 2014/0042811 A1 | 2/2014 | Myamoto et al. |

FOREIGN PATENT DOCUMENTS

| | | |
|---|---|---|
| JP | 2012-044807 A | 3/2012 |
| JP | 2012-228043 A | 11/2012 |
| JP | 2013-017365 A | 1/2013 |

OTHER PUBLICATIONS

International Search Report dated Jul. 8, 2014, issued for International Application No. PCT/JP2014/002764.
Written Opinion of the International Searching Authority issued by Japan Patent Office for International Application No. PCT/JP2014/002764.
Extended European search report dated Jan. 30, 2017 issued by the European Patent Office in counterpart European Patent Application No. 14 80 3837.5. (7 Pages).

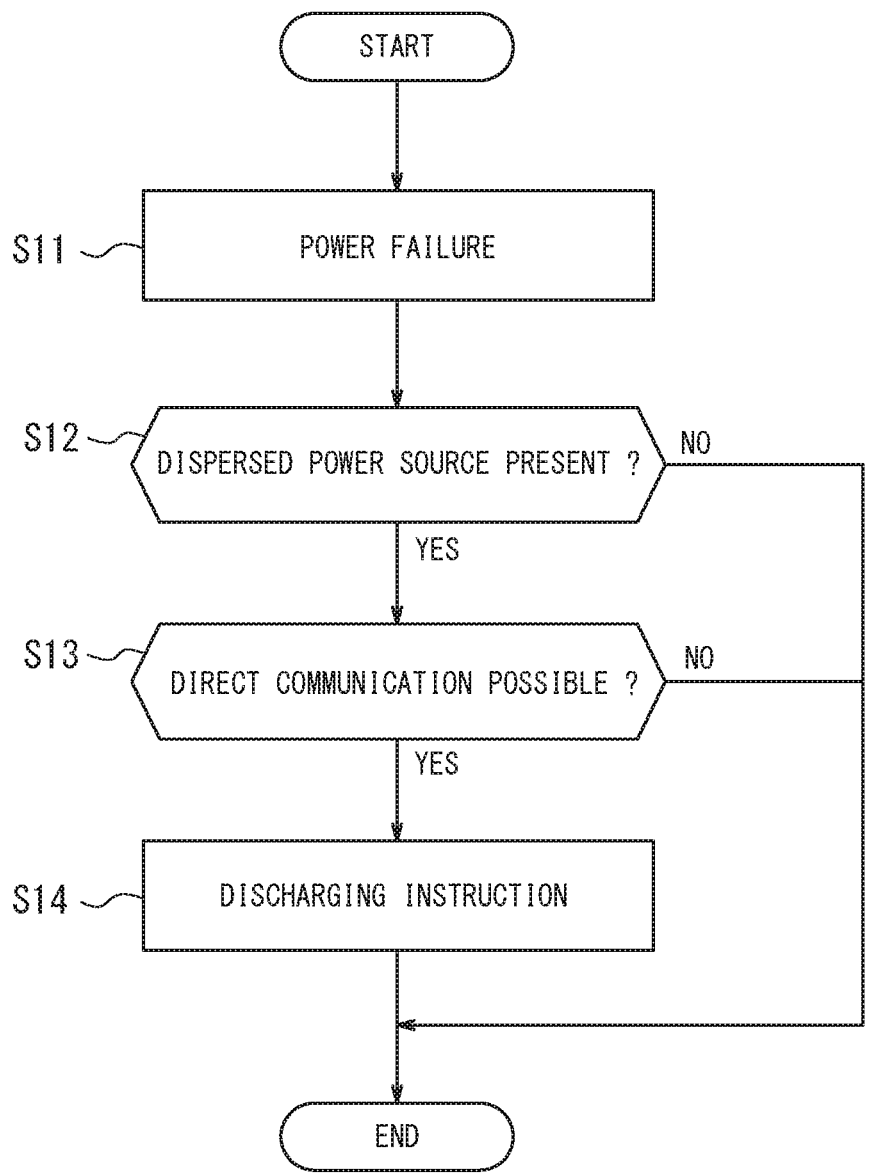

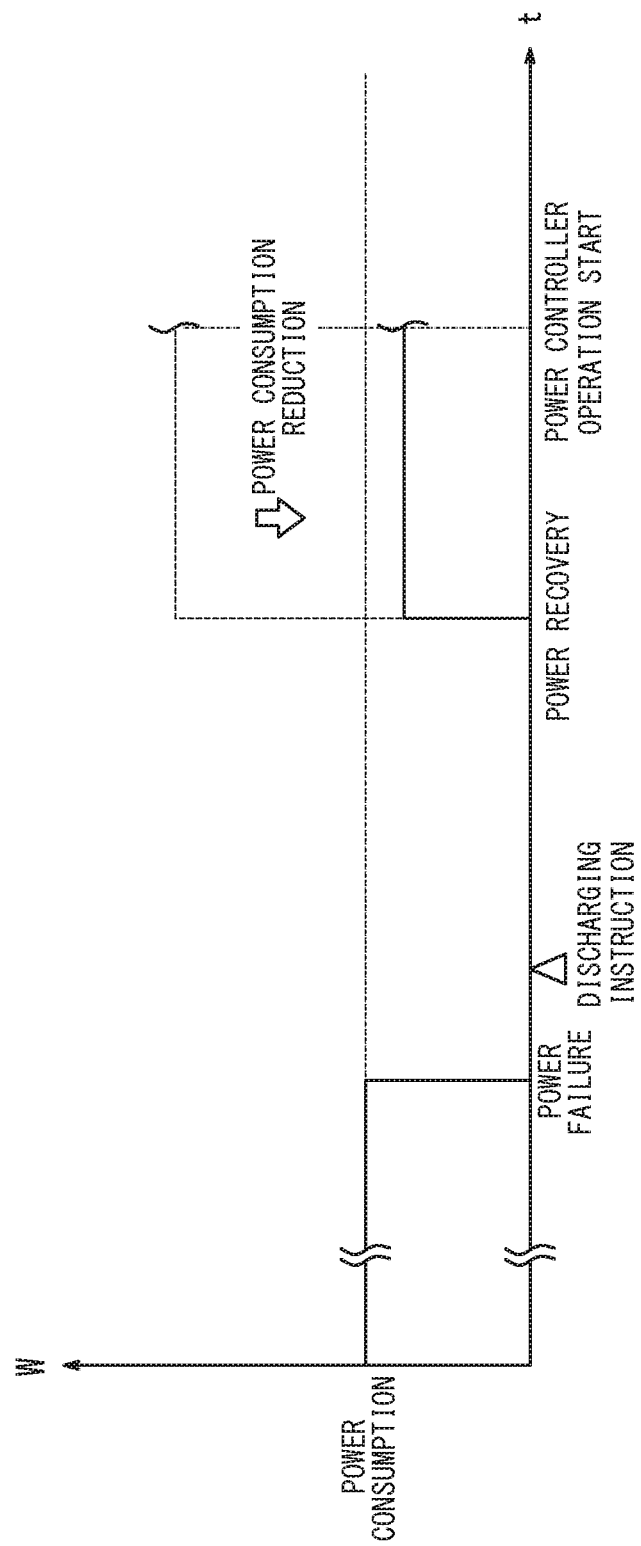

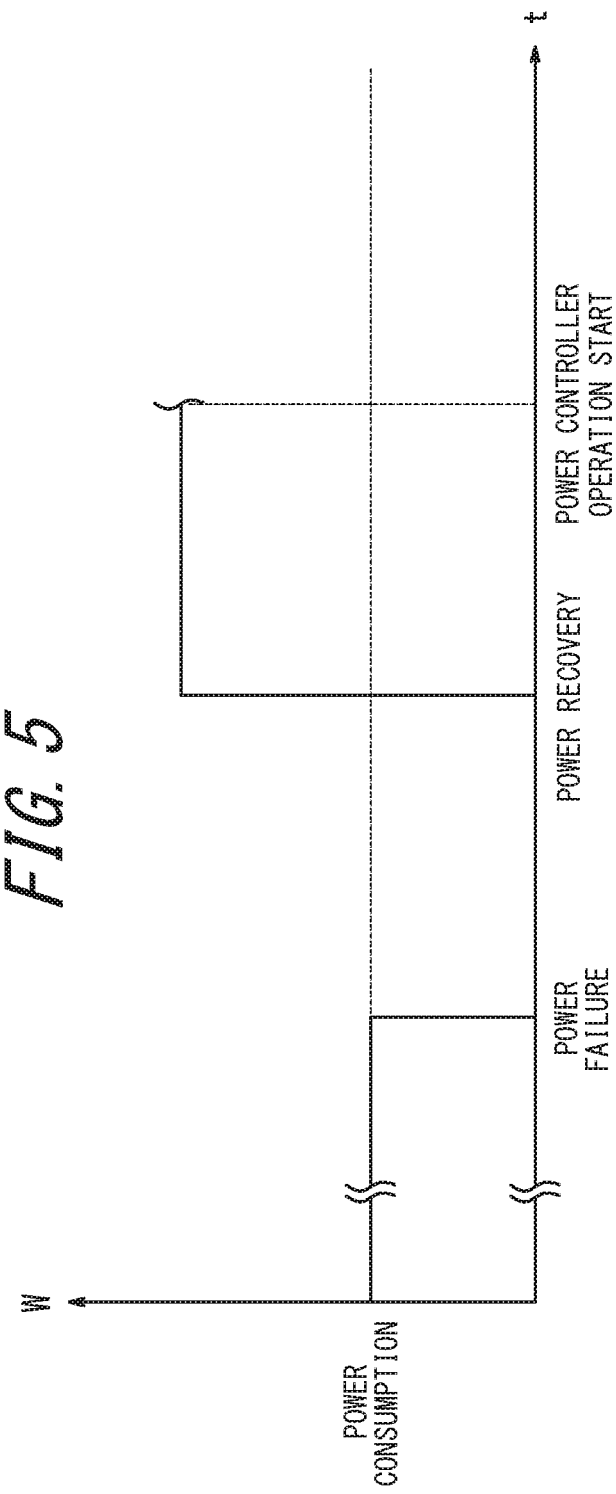

POWER CONTROL DEVICE, POWER CONTROL METHOD, AND POWER CONTROL SYSTEM

CROSS REFERENCE TO RELATED APPLICATION

This application claims priority to Japanese Patent Application No. 2013-111249 (filed on May 27, 2013), the entire disclosure of which is incorporated herein by reference.

TECHNICAL FIELD

The disclosure relates to a power control device, a power control method, and a power control system.

BACKGROUND

Because of the recent concern about electric power shortages and need for global environmental protection, households, shops, buildings, etc. (hereafter referred to as "power consumer's facilities") have been required to save power. In particular, demands for electric power increase in the summer and in the winter, and the power consumption in each power consumer's facility may exceed contract power agreed upon with an electric power company. To effectively save power so that the power consumption does not exceed the contract power, the technique of controlling, by a power control device (e.g. energy management system (EMS)) installed in each power consumer's facility, load apparatuses, dispersed power sources, or the like in the power consumer's facility has been known. In a conventional power control device, the power consumption of each load apparatus is detected by a power sensor, and sensor data acquired by the detection is transmitted to a server or the like. The server or the like transmits a control signal according to the power consumption of each load apparatus while monitoring the power consumption, so that the power consumption of each load apparatus is efficiently reduced.

Consider the case where, when the power control device stops as a result of interruption of power supply due to a power failure or the like and later recovers from the power failure, the power control device stores data in a nonvolatile storage medium. In this case, if the process includes such control that charges a capacitor to prepare for another power failure, the start of the power control device delays and the power control device is not functional, as a result of which the power consumption may exceed the contract power with the electric power company.

In view of this, it has been conventionally proposed to connect any apparatus that is not allowed to stop operation due to a power failure, to an uninterruptible power supply (UPS) (for example, Patent Literature (PTL) 1). With the technique of PTL 1, when power fails, the UPS supplies power and, while power is being supplied from the UPS, apparatuses lower in priority are stopped, thus preventing the power control device from stopping due to the power failure.

CITATION LIST

Patent Literature

PTL 1: JP 2007-43802 A

SUMMARY

Technical Problem

The technique of PTL 1 enables operation even during a power failure, through the use of the UPS. The use of the UPS, however, requires higher cost. In the case where a large capacitor capable of operating for a while during a power failure is used instead of the UPS, the cost and the apparatus size increase. By using a capacitor whose capacity is just enough to execute necessary processes such as properly shutting down apparatuses during a power failure, such increases in cost and apparatus size can be avoided. Even in this case, however, when the capacitor is used, the power control device is not restarted until a backup power source is completely charged. This hinders prompt operation of the power control device.

An air conditioner or a refrigerator, having recovered from a power failure, tends to consume more power for heating or cooling than in normal operation. This causes unexpected power consumption before the operation of the power control device starts, as a result of which the power consumption may exceed the contract power with the electric power company. FIG. 5 is a conceptual diagram of control by a conventional power control device. As illustrated in FIG. 5, there is a possibility of an increase in power consumption after power recovery until the power control device restarts.

It could therefore be helpful to provide a power control device, power control method, and power control system capable of appropriate power control so that power consumption does not exceed contract power with an electric power company even in the event of a power failure.

Solution to Problem

We provide the following.

A power control device installed in a consumer's facility to manage a power state of a load apparatus or a dispersed power source in the consumer's facility, includes: a communicator configured to acquire sensor data relating to the load apparatus or the dispersed power source; a backup power source that is charged with a commercial power source, and supplies power during a power failure; and a controller configured to issue a control instruction to the dispersed power source, when the backup power source supplies power.

Preferably, in the power control device, the controller is configured to determine whether or not direct communication with the dispersed power source is possible, and issue the control instruction to the dispersed power source in the case of determining that the direct communication is possible.

Preferably, in the power control device, the dispersed power source includes a power storage, and the controller is configured to issue a charging suppression instruction to the power storage as the control instruction, in the case where the power storage is in a charging state when the power failure occurs.

Preferably, in the power control device, the dispersed power source includes a power storage, and the controller is configured to issue a discharging instruction to the power storage as the control instruction, in the case where the power storage is not in a discharging state when the power failure occurs.

Preferably, in the power control device, the controller is configured to issue the control instruction in the case where predicted power usage within a reference period based on the sensor data before the power failure is greater than or equal to a predetermined value.

Preferably, in the power control device, the consumer's facility is subjected to power management in a reference period.

A power control method is a method by a power control device installed in a consumer's facility to manage a power state of a load apparatus or a dispersed power source in the consumer's facility, wherein the power control device includes: a communicator configured to acquire sensor data relating to the load apparatus or the dispersed power source; a backup power source that is charged with a commercial power source, and supplies power during a power failure; and a controller configured to issue a control instruction to the dispersed power source, when the backup power source supplies power, and the power control method includes steps of: determining, by the controller, whether or not direct communication with the dispersed power source is possible; and issuing, by the controller, the control instruction to the dispersed power source in the case of determining that the direct communication is possible.

Preferably, in the power control method, the dispersed power source includes a power storage, and the power control method includes a step of issuing, by the controller, a charging suppression instruction to the power storage as the control instruction, in the case where the power storage is in a charging state when the power failure occurs.

Preferably, in the power control method, the dispersed power source includes a power storage, and the power control method includes a step of issuing, by the controller, a discharging instruction to the power storage as the control instruction, in the case where the power storage is not in a discharging state when the power failure occurs.

Preferably, the power control method includes a step of issuing, by the controller, the control instruction in the case where predicted power usage within a reference period based on the sensor data before the power failure is greater than or equal to a predetermined value.

A power control system is a system including a power control device installed in a consumer's facility to manage a power state of a load apparatus or a dispersed power source in the consumer's facility, wherein the power control device includes: a communicator configured to acquire sensor data relating to the load apparatus or the dispersed power source; a backup power source that is charged with a commercial power source, and supplies power during a power failure; and a controller configured to issue a control instruction to the dispersed power source, when the backup power source supplies power, and the controller is configured to determine whether or not direct communication with the dispersed power source is possible, and issue the control instruction to the dispersed power source in the case of determining that the direct communication is possible.

Preferably, in the power control system, the dispersed power source includes a power storage, and the controller is configured to issue a charging suppression instruction to the power storage as the control instruction, in the case where the power storage is in a charging state when the power failure occurs.

Preferably, in the power control system, the dispersed power source includes a power storage, and the controller is configured to issue a discharging instruction to the power storage as the control instruction, in the case where the power storage is not in a discharging state when the power failure occurs.

Preferably, in the power control system, the controller is configured to issue the control instruction in the case where predicted power usage within a reference period based on the sensor data before the power failure is greater than or equal to a predetermined value.

Advantageous Effect

It is thus possible to provide a power control device, power control method, and power control system capable of appropriate power control so that power consumption does not exceed contract power with an electric power company even in the event of a power failure.

BRIEF DESCRIPTION OF THE DRAWINGS

In the accompanying drawings:

FIG. 3 is a flowchart illustrating the operation of the power control device according to one of the disclosed embodiments;

FIG. 4 is a conceptual diagram of control by the power control device according to one of the disclosed embodiments; and FIG. 5 is a conceptual diagram of control by a conventional power control device.

DETAILED DESCRIPTION

The following describes one of the disclosed embodiments.

Embodiment

A power control system including a power control device according to one of the disclosed embodiments is described below. A power control system including a power control device according to this embodiment includes at least one dispersed power source, in addition to power supplied from an electric power grid (commercial power source). Preferable examples of the dispersed power source include a power storage system capable of charging and discharging and a power generation system for supplying power.

The power generation system for supplying power may be any of various power generation systems such as a solar power generation system for supplying power by solar power generation, a fuel cell system having fuel cells such as solid oxide fuel cells (SOFCs), and a gas power generation system for generating power using gas fuel. Moreover, the number of dispersed power sources is not particularly limited, and may be set freely. This embodiment describes an example where a power generator is included as the power generation system and a power storage is included as the power storage system.

Figure 1:
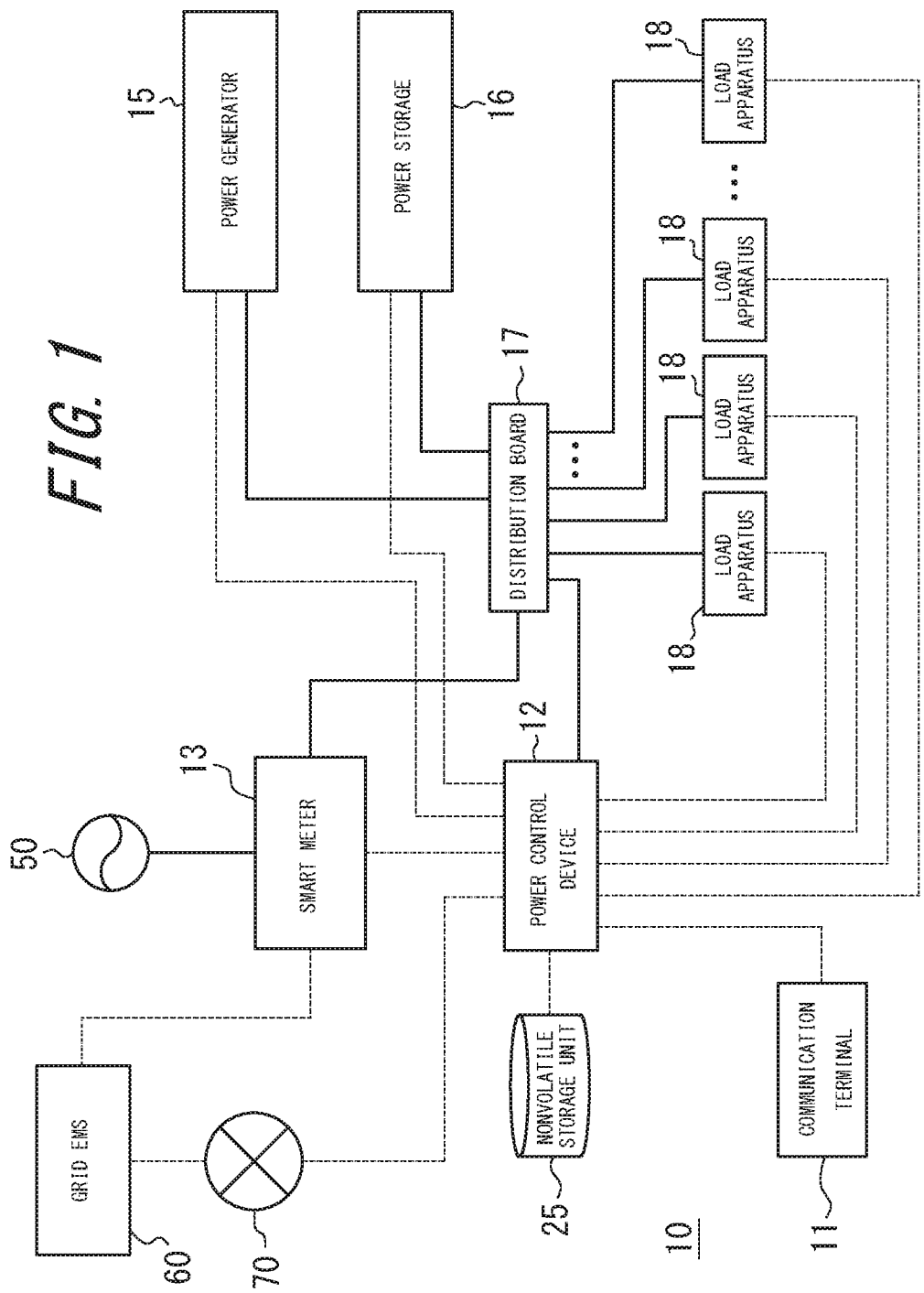
FIG. 1 is a functional block diagram schematically illustrating the configuration of a power control system including a power control device according to one of the disclosed embodiments.

FIG. 1 is a block diagram schematically illustrating the configuration of a power control system 10 including a power control device 12 according to one of the disclosed embodiments. The power control system 10 according to one of the disclosed embodiments includes a communication terminal 11, the power control device 12, a smart meter 13, a power generator 15, a power storage 16, a distribution board 17, and one or more load apparatuses 18.

In FIG. 1, the solid lines between the functional blocks represent the flow of power, and the dotted lines between the functional blocks represent the flow of control signals or information communicated. The communication represented by the dotted lines may be wired communication or wireless communication. Wired communication may be, for example, serial bus communication via a cable according to a standard such as RS-232C or RS-485 or local area network (LAN) communication according to Ethernet™ or the like, though not limited to such. For example, in the case where apparatuses are directly connected to each other by a crossover cable, direct communication is possible without any relay device such as a hub. Wireless communication may be performed by a communication scheme of a wireless LAN or the like via a relay device such as a wireless router or an access point. A communication scheme for direct communication without any relay device, such as ad hoc or Wi-Fi Direct™, may be used, too.

Various schemes are available for communication of information and control signals, including the physical and logical layers. For example, the communication between the power control device 12 and each of the communication terminal 11, the smart meter 13, the power generator 15, and the power storage 16 may be performed by a short-range communication scheme such as ZigBee™. The communication between the power control device 12 and each load apparatus 18 may be performed using various transmission media such as infrared communication and power line communication (PLC). Moreover, on the physical layer suitable for each communication, different types of protocols may be combined with each other: for example, a communication protocol defining the higher layer while imparting a degree of freedom to the physical layer, such as ZigBee SEP 2.0 (Smart Energy Profile 2.0) or ECHONET Lite™, may be combined with a communication protocol defining the physical layer, such as Wi-Fi or PLC. The following describes an example where ECHONET Lite™ is used when the power control device 12 communicates with the communication terminal 11, the smart meter 13, the power generator 15, the power storage 16, and the load apparatuses 18.

The power control system 10 may supply not only power supplied from a commercial power source 50 but also power generated by the power generator 15 and power obtained by discharging the charged power storage 16, to the load apparatuses 18 and the power control device 12.

The communication terminal 11 displays information transmitted from the power control device 12. For example, the communication terminal 11 displays power consumption history information and the like.

The power control device 12 controls and manages the power of each apparatus in the power control system 10 illustrated in FIG. 1. The configuration of the power control device 12 will be described in detail later.

The smart meter 13 is connected to the commercial power source 50, and measures power supplied from the commercial power source 50. The smart meter 13 is also connected to the distribution board 17, and measures power generated by the power generator 15 and sold to an electric power company via the distribution board 17. The smart meter 13 may notify the power control device 12 of the measured power.

The smart meter 13 may also receive information such as power-related predictions from a grid energy management system (EMS) 60. The grid EMS 60 is a facility for performing various power-related predictions, controls, etc., and is typically installed in the electric power company or the like. For example, the grid EMS 60 may include a meter data management system (MDMS). The grid EMS 60 is connectable to a network 70 such as the Internet.

The power generator 15 may output generated power, and supply the power to each load apparatus 18 and/or sell the power to the electric power company. The power generated by the power generator 15 may also be used to charge the power storage 16. The DC power generated by the power generator 15 may be supplied to each load apparatus 18 without being converted into AC power.

The power storage 16 includes a storage battery, and may supply power by discharging the charged storage battery. The power storage 16 may also be charged with power supplied from the commercial power source 50, the power generator 15, etc. The power from the power storage 16 may also be supplied to the load apparatuses 18 and the power control device 12, as illustrated in FIG. 1. The power generator 15 and the power storage 16 may have a power conditioner function of converting DC power to AC power and vice versa.

The distribution board 17 separates supplied power into a plurality of branches and distributes the power to the load apparatuses 18. Each of the branches may be connected directly to a representative load apparatus 18 that consumes a large amount of power, or connected to a group of load apparatuses 18 within the same room. The former load apparatus 18 is, for example, an air conditioner, a refrigerator, or an induction cooker. The latter load apparatus 18 is a load apparatus connected to any of several receptacles located in a room, and which load apparatuses are connected to receptacles is undefined.

In FIG. 1, any number of load apparatuses 18 may be connected in the power control system 10. These load apparatuses 18 are, for example, various electrical appliances such as a television, an air conditioner, and a refrigerator. These load apparatuses 18 are supplied with power via the distribution board 17.

The power control device 12 is described in more detail below.

Figure 2:
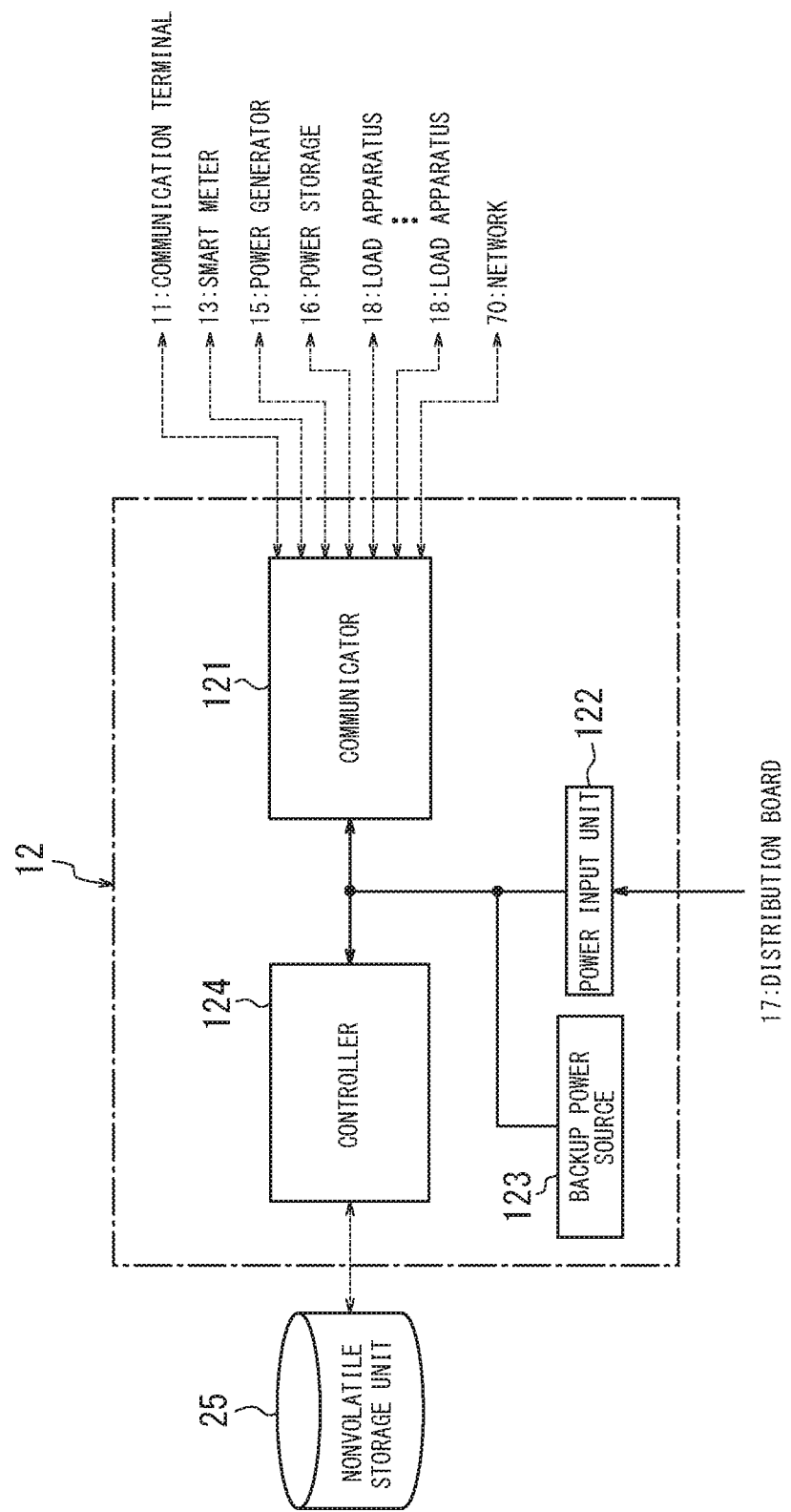
FIG. 2 is a functional block diagram schematically illustrating the configuration of the power control device according to one of the disclosed embodiments.

FIG. 2 is a functional block diagram schematically illustrating the configuration of the power control device 12 according to one of the disclosed embodiments. The power control device 12 is an EMS as an example, and includes a communicator 121, a power input unit 122, a backup power source 123, and a controller 124.

The communicator 121 is an interface as an example, and transmits and receives information and control signals between the controller 124 and each of the communication terminal 11, the smart meter 13, the power generator 15, the power storage 16, and the load apparatuses 18.

For example, the communicator 121 may acquire information of power purchased from and/or power sold to the commercial power source 50, from the smart meter 13. The communicator 121 may also acquire instruction information (hereafter referred to as "power usage reduction instruction") of demand response (DR) relating to power usage reduction, from the electric power company or the like via the smart meter 13. The communicator 121 may also acquire sensor data of power supplied from the power generator 15, the power storage 16, and the commercial power source 50 to the load apparatuses 18 via the plurality of branches separated at the distribution board 17, via sensors installed in the branches. The communicator 121 may also directly acquire information on the amount of power (i.e. charging power) with which the power storage 16 is charged. The communicator 121 may also directly acquire information of power consumption, from each load apparatus 18. The communicator 121 may also acquire various information from the network 70.

The communicator 121 may further acquire control signals from the communication terminal 11, and transmit information indicating the power control and management state in the power control system 10 to the communication terminal 11. The case of employing ECHONET Lite™ is used as an example here.

The power input unit 122 receives power supplied from the commercial power source 50, the power generator 15, and the power storage 16 via the smart meter 13 and the distribution board 17.

The backup power source 123 includes a capacitor such as a supercapacitor, and is charged with the power (i.e. the power supplied from the commercial power source 50, etc.) received by the power input unit 122. In the case where the power input unit 122 cannot receive power from the commercial power source 50 due to a power failure, the charged backup power source 123 is discharged to supply power to the power control device 12 instead of the commercial power source 50. Thus, the backup power source 123 is a power source that temporarily supplies alternative power during a power failure. The backup power source 123 allows the power control device 12 to continue operation for a predetermined time within the range of the charging power of the backup power source 123, even in the event of a power failure. In detail, the power control device 12 operates for the predetermined time within the range of the charging power of the backup power source 123, and sends control instructions to the power generator 15 and the power storage 16. The power control device 12 also performs a process of stopping a nonvolatile storage unit 25, to protect information in the database stored in the nonvolatile storage unit 25 from corruption or inconsistency in the event of a power failure. The backup power source 123 preferably has such a capacity that enables power supply for the operation of the power control device 12 for the predetermined time, power supply for control instructions to the power generator 15 and the power storage 16, power supply for the process of stopping the nonvolatile storage unit 25, and power supply for shutting down the power control device 12.

The controller 124 generates control signals for controlling the power of each apparatus in the power control system 10 and/or information to be transmitted to the communication terminal 11, based on various information such as sensor data acquired by the communicator 121.

The controller 124 also acquires and stores information acquired by the communicator 121, in order to manage the power of each apparatus in the power control system 10. The power control system 10 has the nonvolatile storage unit 25 to store various information such as sensor data acquired by the controller 124. The nonvolatile storage unit 25 may be externally connected to the power control device 12, or included in the power control device 12. For example, the nonvolatile storage unit 25 is flash memory, or a memory card having flash memory.

The power control device 12 may include a volatile storage unit for retaining the stored information only when the power control device 12 is supplied with power, equally to store various information such as sensor data collected by the controller 124. The power control device 12 may transmit the acquired data to an external server via the network 70, to store (back up) the data in the external server.

The controller 124 may determine whether or not a dispersed power source such as the power generator 15 or the power storage 16 is connected, based on information set beforehand upon apparatus installation, etc. or acquired information such as sensor data. The controller 124 may also determine whether or not direct communication with each of the power generator 15 and the power storage 16 is possible. In detail, the controller 124 determines that direct communication is possible, in the case where the communication scheme between the power control device 12 and each of the power generator 15 and the power storage 16 is a communication scheme, e.g. ad hoc or Wi-Fi Direct™, that involves no relay device such as a router, access point, or hub which consumes power supplied from the commercial power source 50. The controller 124 also determines that direct communication is possible, in the case where P2P communication via a crossover cable or the like is possible. In the case where communication involves any relay device, on the other hand, the controller 124 determines that direct communication is not possible. If a relay device that consumes power supplied from the commercial power source 50 is present, there is a possibility that the relay device stops due to a power failure and so cannot perform communication.

The controller 124 may also determine which of the charging state, the discharging state, and the standby state the power storage 16 is in when the power failure occurs, from information acquired via the communicator 121. In detail, the controller 124 acquires information relating to the state of the power storage 16 before the power failure, which has been stored in the nonvolatile storage unit 25 before the power failure. The controller 124 determines which of the charging state, the discharging state, and the standby state the power storage 16 is in, based on the acquired information.

The controller 124 may also send a discharging instruction to the power generator 15 and a discharging instruction or a charging suppression instruction to the power storage 16, while power is being supplied from the backup power source 123 due to the power failure. The charging suppression instruction includes an instruction to decrease the charging rate or capacity, or an instruction to stop charging.

The controller 124 may also calculate a prediction value of the power usage (hereafter referred to as "predicted power usage") within a reference period based on sensor data before the power failure. The controller 124 may determine whether or not the calculated predicted power usage is likely to exceed permissible power usage. The predetermined value is preferably the power usage permissible within the reference period, but is not limited to such. The predetermined value may be less than the permissible power usage. For example, the predetermined value may be 80% of the permissible power usage. In the case where the predicted power usage is greater than or equal to the predetermined value, the possibility that the permissible power usage within the reference period is exceeded is relatively high, and so it is preferable to control the power consumption by the power control device 12.

The reference period (demand time limit) is a period on which contract power agreed upon between a business operator of a shop or the like (consumer's facility) and an electric power company is based. For example, in the case where the reference period is 30 minutes and the contract power is 300 kw, the business operator is permitted to consume 300 kw of power on average in the reference period. The time elapsed from the start of the reference period to the current time may be, for example, determined by acquiring time-related information from the smart meter 13 or using a system clock included in the power control device 12.

The following describes the operation of the power control device 12 according to one of the disclosed embodiments, with reference to a flowchart in FIG. 3. Before a power failure, the power control device 12 repeatedly performs an operation of acquiring various sensor data mentioned above and retaining (storing) the acquired sensor data in the nonvolatile storage unit 25 at regular or irregular intervals.

When a power failure occurs (step S11), the controller 124 determines whether or not a dispersed power source such as the power generator 15 or the power storage 16 is connected based on the information before the power failure, with power supplied from the backup power source 123 (step S12).

In the case where the controller 124 determines that a dispersed power source is connected (a dispersed power source is present) (step S12: YES), the controller 124 determines whether or not direct communication with the dispersed power source is possible (step S13). In the case where the controller 124 determines that no dispersed power source is present (step S12: NO), on the other hand, the controller 124 ends the process without issuing the discharging instruction.

In the case where the controller 124 determines that direct communication with the dispersed power source is possible (step S13: YES), the controller 124 sends the discharging instruction to the dispersed power source via the communicator 121 (step S14), and ends the process. In the case where the controller 124 determines that direct communication with the dispersed power source is not possible (step S13: NO), the controller 124 ends the process without issuing the discharging instruction.

Having received the discharging instruction, the power generator 15 and/or the power storage 16 as the dispersed power source starts discharging as the load apparatuses 18 are activated, after power recovery. In this way, even when the power control device 12 is not functional as it takes time to prepare for the start of the power control device 12, the consumption of power from the commercial power source 50 can be reduced by the power supply from the power generator 15 and/or the power storage 16. Thus, the power usage can be kept from exceeding the permissible power usage within the reference period, even if the power control device 12 is not in operation after recovery from the power failure. FIG. 4 is a conceptual diagram of control by the power control device 12. As illustrated in FIG. 4, by issuing the discharging instruction after the power failure occurs, the power consumption after the power recovery until the power control device 12 restarts can be reduced.

The power control device 12 according to this embodiment sends the control instruction only to the dispersed power source that can be directly communicated. Since there is no need to issue any unnecessary control instruction, the power of the backup power source 123 can be saved. Moreover, increases in cost and apparatus size caused by the use of an uninterruptible power supply or a large capacitor can be avoided. In the case of receiving the discharging instruction from the power control device 12, the power generator 15 or the power storage 16 may start discharging to the load apparatuses 18 without waiting for the recovery from the power failure.

Although the above embodiment describes the case where the power control device 12 determines whether or not a dispersed power source is connected and determines whether or not direct communication with the dispersed power source is possible, the power control device 12 may omit such determination. In detail, after the power failure occurs, the power control device 12 may immediately send the control instruction to the dispersed power source, with power supplied from the backup power source 123. In this case, if a directly communicable dispersed power source is present, not only the same advantageous effect as in the above embodiment can be attained, but also the power consumption can be reduced and the processing speed can be increased by skipping the determination process.

In the case where the power storage 16 which is in the charging state when the power failure occurs is connected, charging the power storage 16 again after the recovery from the power failure increases the power consumption, as a result of which the contract power with the electric power company may be exceeded. In view of this, in the case where the power storage 16 is connected and is in the charging state when the power failure occurs, the power control device 12 preferably sends the charging suppression instruction to the power storage 16. This reduces the power consumption after the recovery from the power failure, and keeps the power usage from exceeding the contract power with the electric power company.

The power control device 12 preferably issues the control instruction only in the case where the predicted power usage within the reference period based on the sensor data before the power failure is greater than or equal to the predetermined value. This prevents the issuance of any unnecessary control instruction in the case where, for example as during late night hours, the power consumption of the load apparatuses 18 is low and the power consumption is clearly unlikely to exceed the contract power with the electric power company with reference to the sensor data before the power failure, so that the power of the backup power source 123 can be saved. In addition, unnecessary discharge from the power storage 16 can be avoided.

A computer may be suitably used to function as the power control device 12. In detail, the power control device 12 can be realized by a central processing unit (CPU) or DSP of the computer reading and executing a program which is stored in a storage medium of the computer and in which the processes for achieving the functions of the power control device 12 are written.

Although the disclosed apparatus, method, and system have been described by way of the drawings and embodiments, various changes and modifications may be easily made by those of ordinary skill in the art based on the disclosure. Such various changes and modifications are therefore included in the scope of the disclosure. For example, the functions included in the means, steps, etc. may be rearranged without logical inconsistency, and a plurality of means, steps, etc. may be combined into one means, step, etc. and a means, step, etc. may be divided into a plurality of means, steps, etc.

REFERENCE SIGNS LIST 10 power control system
11 communication terminal
12 power control device
13 smart meter
15 power generator
16 power storage
17 distribution board
18 load apparatus
25 nonvolatile storage unit
50 commercial power source
60 grid EMS
70 network 121 communicator
122 power input unit
123 backup power source
124 controller

The invention claimed is:

1. A power control device, to be located at a consumer's facility, to manage a power state of a load apparatus or a dispersed power source in the consumer's facility, the power control device comprising:
   a communicator configured to acquire sensor data relating to the load apparatus or the dispersed power source;
   a backup power source configured to be charged with a commercial power source, and to supply power during a power failure; and
   a controller configured to send a control instruction to the dispersed power source, when the backup power source supplies power.

2. The power control device according to claim 1, wherein the controller is configured to determine whether or not direct communication with the dispersed power source is possible, and send the control instruction to the dispersed power source in the case of determining that the direct communication is possible.

3. The power control device according to claim 1, wherein the dispersed power source includes a power storage, and
   the controller is configured to send a charging suppression instruction to the power storage as the control instruction, in the case where the power storage is in a charging state when the power failure occurs.

4. The power control device according to claim 1, wherein the dispersed power source includes a power storage, and
   the controller is configured to issue a discharging instruction to the power storage as the control instruction, in the case where the power storage is not in a discharging state when the power failure occurs.

5. The power control device according to claim 1, wherein the controller is configured to send the control instruction in the case where predicted power usage within a reference period based on the sensor data before the power failure is greater than or equal to a predetermined value.

6. The power control device according to claim 1, wherein the consumer's facility is subjected to power management in a reference period.

7. A power control method by a power control device installed in a consumer's facility to manage a power state of a load apparatus or a dispersed power source in the consumer's facility, wherein the power control device includes:
   a communicator configured to acquire sensor data relating to the load apparatus or the dispersed power source;
   a backup power source configured to be charged with a commercial power source, and supply power during a power failure; and
   a controller configured to issue a control instruction to the dispersed power source, when the backup power source supplies power, the power control method including steps of:
   determining, by the controller, whether or not direct communication with the dispersed power source is possible; and
   sending, by the controller, the control instruction to the dispersed power source in the case of determining that the direct communication is possible.

8. The power control method according to claim 7, wherein the dispersed power source includes a power storage, further including a step of sending, by the controller, a charging suppression instruction to the power storage as the control instruction, in the case where the power storage is in a charging state when the power failure occurs.

9. The power control method according to claim 7, wherein the dispersed power source includes a power storage, further including a step of
   sending, by the controller, a discharging instruction to the power storage as the control instruction, in the case where the power storage is not in a discharging state when the power failure occurs.

10. The power control method according to claim 7, including a step of
    sending, by the controller, the control instruction in the case where predicted power usage within a reference period based on the sensor data before the power failure is greater than or equal to a predetermined value.

11. A power control system comprising a power control device to be installed in a consumer's facility to manage a power state of a load apparatus or a dispersed power source in the consumer's facility,
    wherein the power control device includes:
    a communicator configured to acquire sensor data relating to the load apparatus or the dispersed power source;
    a backup power source configured to be charged with a commercial power source, and to supply power during a power failure; and
    a controller configured to issue a control instruction to the dispersed power source, when the backup power source supplies power, and
    the controller is configured to determine whether or not direct communication with the dispersed power source is possible, and send the control instruction to the dispersed power source in the case of determining that the direct communication is possible.

12. The power control system according to claim 11, wherein the dispersed power source includes a power storage, and
    the controller is configured to send a charging suppression instruction to the power storage as the control instruction, in the case where the power storage is in a charging state when the power failure occurs.

13. The power control system according to claim 11, wherein the dispersed power source includes a power storage, and
    the controller is configured to send a discharging instruction to the power storage as the control instruction, in the case where the power storage is not in a discharging state when the power failure occurs.

14. The power control system according to claim 11, wherein the controller is configured to send the control instruction in the case where predicted power usage within a reference period based on the sensor data before the power failure is greater than or equal to a predetermined value.

* * * * *